US008849247B2

(12) United States Patent
Yu (10) Patent No.: US 8,849,247 B2
(45) Date of Patent: Sep. 30, 2014

(54) REMOTE MOBILE DEVICE INFORMATION RETRIEVAL

(75) Inventor: Xiaohong Yu, Beijing (CN)

(73) Assignee: IGRS Engineering Lab Ltd., Beijing (CN)

( * ) Notice: Subject to any disclaimer, the term of this patent is extended or adjusted under 35 U.S.C. 154(b) by 139 days.

(21) Appl. No.: 13/258,301

(22) PCT Filed: Sep. 16, 2010

(86) PCT No.: PCT/CN2010/076979
§ 371 (c)(1),
(2), (4) Date: Sep. 21, 2011

(87) PCT Pub. No.: WO2012/034279
PCT Pub. Date: Mar. 22, 2012

(65) Prior Publication Data
US 2012/0289195 A1     Nov. 15, 2012

(51) Int. Cl.
| | | |
|---|---|---|
| *H04W 12/08* | (2009.01) | |
| *H04W 12/02* | (2009.01) | |
| *H04W 4/00* | (2009.01) | |
| *H04L 29/06* | (2006.01) | |
| *H04W 12/06* | (2009.01) | |
| *H04W 8/20* | (2009.01) | |

(52) U.S. Cl.
CPC ............. *H04W 12/06* (2013.01); *H04W 12/02* (2013.01); *H04W 8/20* (2013.01); *H04W 4/00* (2013.01); *H04L 63/18* (2013.01); *H04L 63/0428* (2013.01)

USPC .......................................... 455/411; 455/414.1

(58) Field of Classification Search
USPC .................... 455/411, 414.1, 466, 550.1, 558
See application file for complete search history.

(56) References Cited

U.S. PATENT DOCUMENTS

| | | | |
|---|---|---|---|
| 7,813,725 B2 | 10/2010 | Celik | |
| 2004/0187018 A1* | 9/2004 | Owen et al. | 713/200 |
| 2006/0212482 A1* | 9/2006 | Celik | 707/104.1 |
| 2008/0293388 A1* | 11/2008 | Sobieszek et al. | 455/414.1 |
| 2009/0215477 A1* | 8/2009 | Lee et al. | 455/466 |

FOREIGN PATENT DOCUMENTS

| | | |
|---|---|---|
| CN | 1747370 A | 3/2006 |
| CN | 101360273 A | 2/2009 |
| CN | 101578892 A | 11/2009 |

OTHER PUBLICATIONS

International Patent Application No. PCT/CN2010/076979: International Search Report dated Jul. 7, 2011, 10 pages.

* cited by examiner

*Primary Examiner* — Myron K Wyche
(74) *Attorney, Agent, or Firm* — Dorsey & Whitney LLP (57) ABSTRACT

Technologies are generally described related to remotely retrieving information from a mobile device. One example method for distributing information via a mobile network may include receiving, by a first mobile device from a second mobile device, a data request for a first set of information, wherein the data request includes a passcode. The example method may include authenticating the second mobile device using the passcode, and sending the first set of information stored on the first mobile device to the second mobile device via the mobile network.

20 Claims, 7 Drawing Sheets

REMOTE MOBILE DEVICE INFORMATION RETRIEVAL

CROSS-REFERENCE TO RELATED APPLICATIONS

This application is the National Stage of International Application No. PCT/CN2010/076979, filed Sep. 16, 2010, the disclosure of which is incorporated herein by reference in its entirety.

TECHNICAL FIELD

The disclosed technology generally relates to mobile communications and, more specifically, to data retrieval from a remote mobile device.

BACKGROUND

A mobile device may store various types of information, such as contact information (e.g., phone numbers and email addresses), call history, and text messages. Such stored information generally needs to be accessed at or retrieved using the mobile device. Therefore, when the mobile device is misplaced or is not in the possession of its user, the user may not be able to easily access such stored information.

Moreover, a user may have multiple mobile devices for different usages. For example, one mobile device may be for personal usage, while another mobile device may be for business and working purposes. Thus, the user may need to be in physical possession of both mobile devices in order to access the information stored on them. If the user is in possession of only one of the two mobile devices, the user may not be able to access information, such as missed calls, that is stored on the other mobile device.

SUMMARY

In accordance with some embodiments of the present disclosure, a method for distributing information via a mobile network is disclosed. In one embodiment, a method for distributing information via a mobile network may be implemented by receiving, by a first mobile device from a second mobile device, a data request for a first set of information, where the data request includes a passcode. The second mobile device may be authenticated using the passcode and the first set of information stored on the first mobile device may be sent to the second mobile device via the mobile network.

In accordance with other embodiments of the present disclosure, a mobile device may be configured to distribute information via a mobile network, where the mobile device may be configured with an information storage configured to store information for the mobile device and a mobile data exchange system coupled to the information storage. The mobile data exchange system may be configured to authenticate a remote device using a passcode embedded in a data request for a first set of information, and, responsive to authenticating the remote device, transmit a first set of information retrieved from the information storage.

In accordance with still other embodiments of the present disclosure, a computer-readable medium including a sequence of instructions for distributing information via a mobile network, which when executed by a first mobile device, may cause a first mobile device to, in response to a data request for a first set of information received from a second mobile device, authenticate the second mobile device using a passcode received with the data request. Upon authentication of the second mobile device, the sequence of instructions may cause the first mobile device to transmit the first set of information stored on the first mobile device to the second mobile device.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Briefly stated, technologies described herein generally include methods, apparatuses, computer programs, and systems related to remotely retrieving information from a mobile device. By way of an example scenario, a user, such as a human being, may possess two mobile devices, for example, a cell phone and a smart-phone. Moreover, the user's contact information may only be stored on the smart-phone and not the cell phone. One day, the user may have left the smart-phone at home and may only have the cell phone. Needing to obtain information stored on the smart-phone, the user can use the cell phone to retrieve the needed information from the smart-phone that the user left at home. In at least some of the described embodiments, a mobile data exchange system (hereinafter "MDES") is installed on and configured to execute on the mobile devices, and allows for the exchange of information between the mobile devices on which the MDES is installed. Continuing the example scenario above, the cell phone may provide a user interface with which the user can request information from the smart-phone. In response to the user making such a request, the MDES on the cell phone may transmit a data request to the smart-phone. The data request may include a passcode for authentication purposes. The MDES on the smart-phone may extract the passcode from the received data request and, upon authenticating of the cell phone using the passcode, may transmit the information requested by the data request to the cell phone. In some embodiments, the data request may be encrypted. Thus, even though a mobile device may not be readily accessible, certain information stored on the mobile device may nevertheless be retrieved securely using another mobile device.

Throughout the disclosure, the term "passcode" may broadly refer to a unique code that can be used to authenticate/authorize a mobile device or a mobile device user. For example, the mobile device may evaluate a received passcode in order to allow access/retrieval of certain information stored on the mobile device. In some embodiments, the passcode may be a serial number of a mobile device. Alternatively, the passcode may also be a password with sufficient security strength (e.g., having more than 6 characters, mixed with upper-case characters, lower-case characters, and/or digits).

Figure 1:
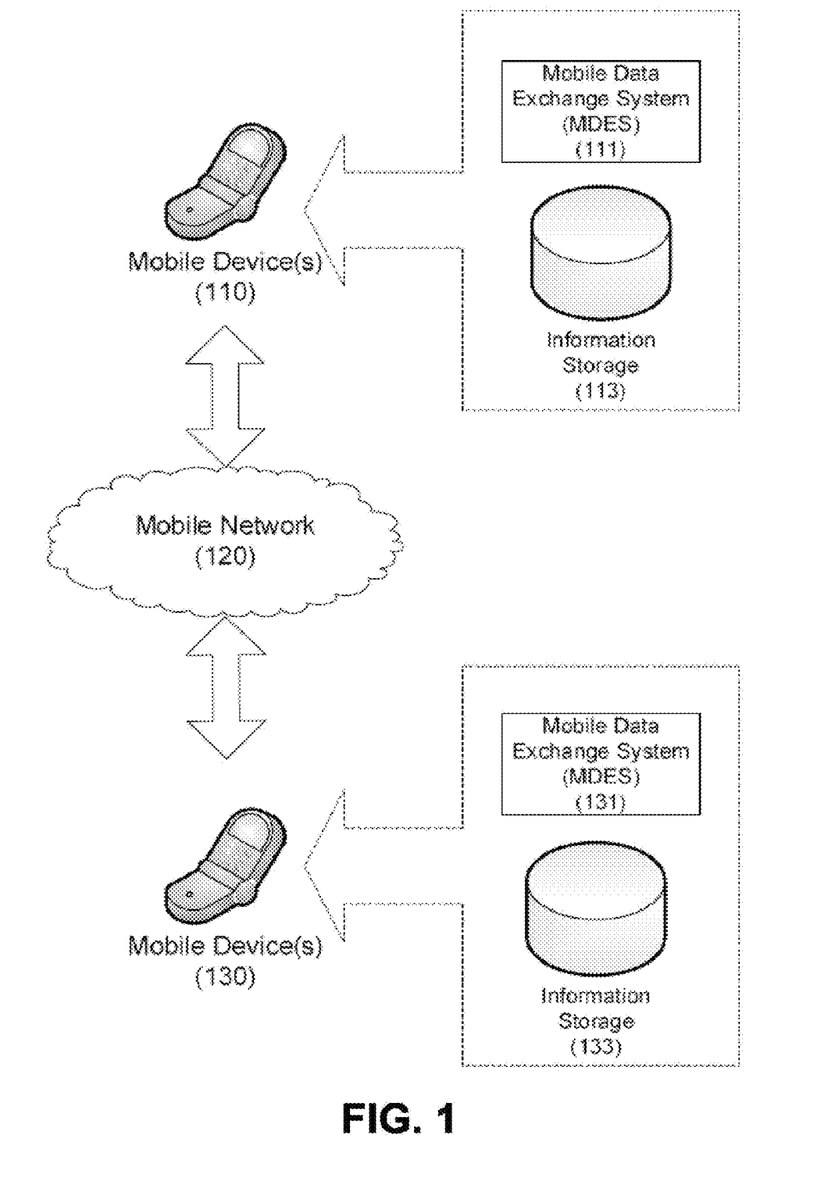
FIG. 1 shows a block diagram of a non-limiting operational environment in which illustrative embodiments of a mobile data exchange system may operate.

FIG. 1 shows a block diagram of a non-limiting operational environment in which illustrative embodiments of a mobile data exchange system may operate. In FIG. 1, a mobile device 110 and a mobile device 130 may be coupled to one another via a mobile network 120. Mobile device 110 and mobile device 130 may each be any type of wireless mobile communications device, including a mobile telephone, smart phone, tablet computer, netbook, personal data assistant (PDA), mobile computer, wireless email device, any other network appliance capable of communicating over the mobile network 120, or any combination thereof. Alternatively, while mobile device 110 and mobile device 130 as illustrated represent wireless mobile communications devices, each of these devices may also represent a wired device, such as a landline telephone, computer, email device, or any other communications device or any combination thereof. In some embodiments, mobile device 110 and/or mobile device 130 may support various mobile telecommunication standards and may be configured to communicate with other applications and/or devices in a network environment, such as mobile network 120. All such embodiments are contemplated as within the scope of the present disclosure.

In some embodiments, mobile network 120 may be, without limitation, a wireless network, such as a mobile cellular network (e.g., GSM, CDMA, or TDMA), a wireless local area network (WLAN), a wireless Metropolitan area network (WMAN), or the like or any combination thereof. Mobile network 120 may also include, or may be communicatively connected to, a wired network, such as a public switched telephone network (PSTN). Mobile network 120 may be any type of network capable of providing wireless and/or wired data and/or voice communications services to devices of any type. Mobile network 120 represents any number of interconnected networks that may be composed of any number and type of wired and/or wireless network devices. All such embodiments are contemplated as within the scope of the present disclosure. Network communications, such as HTTP requests/responses, Wireless Application Protocol (WAP) messages, Mobile Terminated (MT) Short Message Service (SMS) messages, Mobile Originated (MO) SMS messages, or any type of network messages may be exchanged among the devices coupled to mobile network 120.

In some embodiments, information storage 113 and information storage 133 may be used to store contact information, such as phone numbers and email addresses, text messages that are sent or received, email messages that are sent or received, and/or call logs (e.g., time stamp or number of missed calls, dialed calls, and/or received calls). Any other type of data may also, or instead, be stored in information storage 113 and 133, such as image files (e.g., pictures), audio files, video files, electronic documents, executable applications, etc.

In some embodiments, mobile device 110 may request information stored in information storage 133 of mobile device 130 via mobile network 120. In such embodiments, or in alternate embodiments, mobile device 130 may request information stored in information storage 113 of the mobile device 110 via mobile network 120. Similarly, via mobile network 120, mobile device 110 may transmit information stored in information storage 113 to mobile device 130, and mobile device 130 may transmit information stored in information storage 133 to mobile device 110. In short, mobile devices such as mobile device 110 and mobile device 130 may be configured to request and receive information from another mobile device. In some embodiments, such requests and retrieval of information may be enabled by the configuration of a mobile data exchange system (MDES) on such devices.

In one embodiment, MDES 111 and MDES 131 may be configured on mobile device 110 and mobile device 130, respectively. MDES 111 and/or MDES 131 may be configured to authenticate a remote mobile device using authentication related information (e.g., passcode). MDES 111 may be preconfigured with the authentication related information for verifying the identity of mobile device 130, and MDES 131 may be preconfigured with the authentication related information for verifying the identity of mobile device 110. The preconfiguration of such identity data may be performed by a user common to both devices. For example, a single user of both mobile device 110 and mobile device 130 may configure MDES 111 with identity information for mobile device 130. Such identity information may be a user-defined password, the serial number of mobile device 130, or any other code or identifying information that may be used by MDES 111 to confirm that a message received from mobile device 130 originated, was generated by, or otherwise the result of the operation of mobile device 130. Note that a "serial number" as used herein may refer to any number, code, or identifying data that may be associated with a mobile device, including, but not limited to, an international mobile subscriber identifier (IMSI), a national mobile station identity (NMSI), a mobile identification number (MIN), a mobile directory number (MDN), an electronic serial number (ESN), a mobile station identification number (MSIN), and a phone number.

MDES 111 and MDES 131 may also be configured to encrypt, decrypt, and process data requests sent and/or received by mobile device 110 and mobile device 130. Further, MDES 111 and MDES 131 may be configured to transmit/retrieve information to/from the mobile devices 110 and 130. The details of authentication and information retrieval are further described below.

Figure 2:
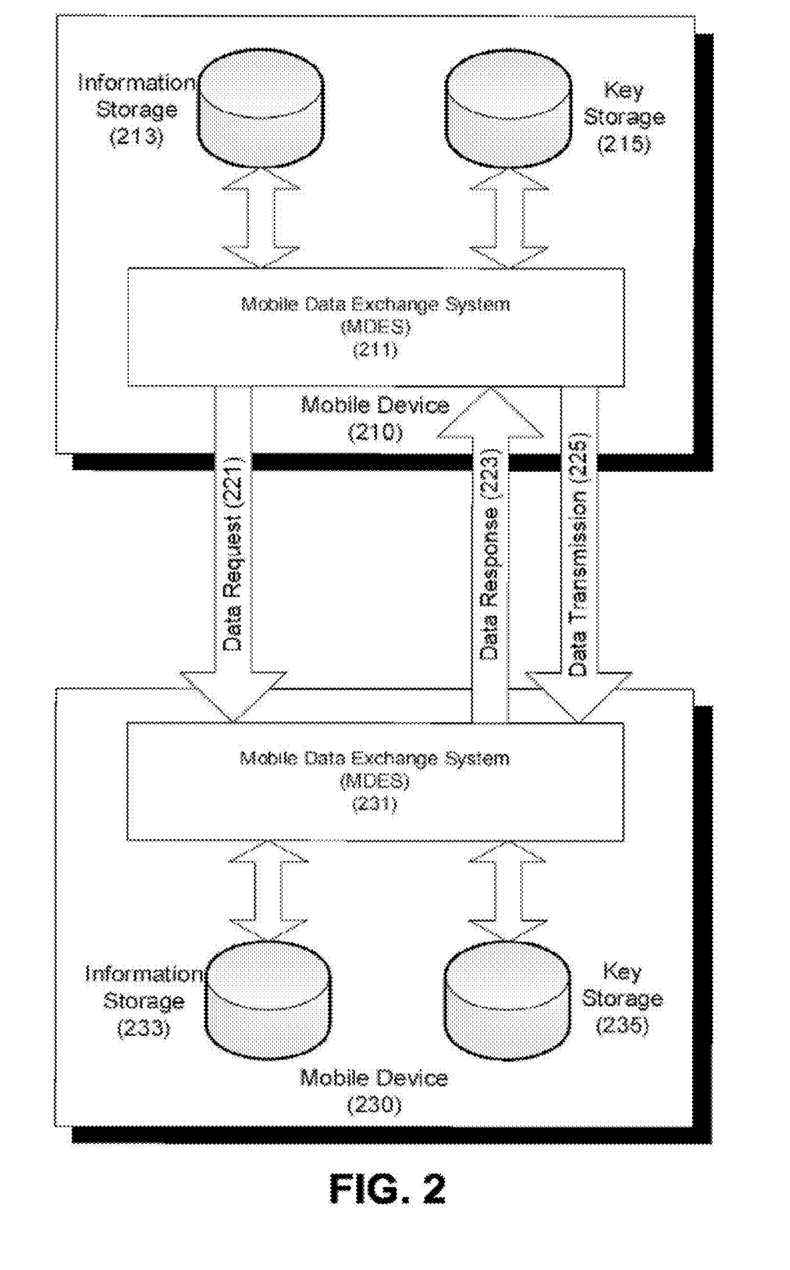
FIG. 2 shows an illustrative embodiment of a message exchange scenario for a first mobile device to remotely retrieve information from a second mobile device.

FIG. 2 shows an illustrative embodiment of a message exchange scenario for a first mobile device to remotely retrieve information from a second mobile device. In FIG. 2, a mobile device 210 and a mobile device 230 may transmit/retrieve information to/from each other. Mobile device 210 may be configured with a MDES 211 and mobile device 230 may be configured with a MDES 231. Mobile device 210 may also be configured with an information storage 213 and a key storage 215. Mobile device 230 may be configured with an information storage 233 and a key storage 235. In one embodiment, mobile devices 210 and 230 may be similar to mobile devices 110 and 130 of FIG. 1, MDES 211 and 231 may be similar to MDES 111 and 131 of FIG. 1, and information storage 213 and 233 may be similar to information storage 113 and 133 of FIG. 1.

In some embodiments, MDES 211 and MDES 231 may be configured to control the transmission and retrieval of information based on existing communication means supported by mobile devices 210 and 230. MDES 211 may remotely control the mobile device 230 and/or MDES 231 may remotely control the mobile device 210, even when the two mobile devices are not being actively operated by any human operator. For example, mobile device 230 may be powered on and may receive phone calls, text messages, emails, or any other type of communications. However, mobile device 230 may not be readily accessible by a user, and therefore phone calls, text messages, emails, etc. received on mobile device 230 may not answered, viewed, or otherwise detected by a user of mobile device 230. In some situations, the missed communications may require immediate attention. In such situations, the present embodiments provide a means for MDES 211 to retrieve the above information stored in the information storage 233. Alternatively, information storage 233 may contain data, such as pictures, audio files, or electronic documents, which are needed by a user of mobile device 230 who is not able to physically access mobile device 230 at the present time. The presently disclosed embodiments provide a means for such a user to retrieve such data by operating another mobile device, such as mobile device 210.

In one embodiment, MDES 211, utilizing existing communication means supported by mobile device 210 (e.g., cellular phone calls, text messaging, multimedia messaging, or emails), may transmit data request 221 to mobile device 230 requesting information stored in information storage 233. Such stored information may include any data capable of being stored in a storage device or means of any type, including the information types described herein. Data request 221 may include a passcode as described herein, and such a passcode may be encrypted separately from data request 221. MDES 231 of mobile device 230 may be configured to automatically process data request 221 upon receipt of data request 221 via a received phone call, text message, multimedia message, email, etc. In one embodiment, MDES 231 may be configured to receive data request 221 from an operating system of mobile device 230 or from some other subsystem or means configured on mobile device 230 that may be configured to receive and process communications. Alternatively, MDES 231 may itself be configured to process received communications and extract or otherwise determine the content of data request 221.

To ensure security during data transmission between the two mobile devices, in one embodiment MDES 211 may encrypt data request 221. For example, MDES 211 may send data request 221 via a text message from mobile device 210 to mobile device 230. MDES 211 may encrypt data request 221 and transmit data request 221 within the payload of a text message addressed to the phone number of mobile device 230. Once the mobile network service provider (not shown in FIG. 2) delivers this text message to mobile device 230, MDES 231 of mobile device 230 may detect the arrival of the text message, or detect the arrival of the content of the text message as presented to MDES 231 by another subsystem of mobile device 230, and decrypt the text message to obtain data request 221. MDES 231 may then process data request 221 to determine the requested actions, and perform the actions specified in data request 221.

In other embodiments, similar to text messages, MDES 211 may transmit encrypted data request 221 via an email. The mobile network service provider (not shown in FIG. 2) may deliver the email to mobile device 230. When MDES 231 receives such an email, or detects the content of such an email as presented to MDES 231 by another subsystem of mobile device 230, MDES 231 may extract encrypted data request 221 (e.g., as an attachment to the email), decrypt it, and obtain data request 221.

In some other embodiments, MDES 211 may include data request 221 in a phone call and dial the phone number of mobile device 230. In one embodiment, data request 221 may be included in a phone call as audio data. MDES 231 may be configured to cause mobile device 230 to automatically answer incoming phone calls, if a user has not manually operated mobile device 230 to receive the incoming phone call within a predetermined amount of time. Once a phone call is established, MDES 231 may implement voice recognition techniques to recognize audio data that includes data request 221 sent by MDES 211. MDES 211 may also respond by mimicking the dialing or pressing of an alphanumeric key to send audio commands back to MDES 231.

Alternatively, data request 221 may be included as non-audio data that accompanies a voice phone call request. For example, data request 221 may be included with phone call related data such as caller identification, or may be included in one or more Internet protocol (IP) packets accompanying a phone call made using voice over IP (VoIP) technology. MDES 231 may be configured to detect data request 221 without answering the incoming phone call, for example, by detecting the content of data packets that accompany a VoIP call. Any other means of detecting data request 221 and/or its associated content be receiving, answering, or otherwise processing a voice phone call are contemplated as within the scope of the present disclosure.

In some embodiments, data request 221 may contain a passcode for authentication/authorization purposes. As set forth above, such a passcode may be any code, number, identifier, or other data that may be associated with mobile device 210. MDES 231 may authenticate data request 221 by determining the passcode from data request 221 and comparing the passcode to one or more passcodes stored in key storage 235 to determine if it matches one of the stored passcodes. This process may ensure that data request 221 actually originated from mobile device 210, and to prevent an unauthenticated/unauthorized mobile device from obtaining private information from mobile device 230. Key storage 235 of mobile device 230 may be configured with passcodes associated with a group of trusted devices. Such passcodes may be referred to as "key information." Note that the passcode contained in data request 221 may be encrypted and MDES 231 may decrypt the passcode before determining if it matches any stored passcodes.

In some embodiments, data request 221 may indicate the types of information and/or the duration associated with the information that mobile device 210 is interested in. For example, data request 221 may ask for, without limitation, a call log of missed calls, a log of all the received text messages on a particular day, or a log of all the emails received within a certain five hour period. Responsive to this request, MDES 231 may extract the relevant information from information storage 233, package the extracted information as data response 223, and transmit data response 223 using the same or different communication means as was used to receive data request 221. In other words, data response 223 may be transmitted to mobile device 210 using various means, including, without limitation, a text message, a connected phone call, or a reply-email. Further, data response 223 may also be encrypted for security purposes.

In some embodiments, after proper authentication of the passcode by MDES 231 of mobile device 230, mobile device 210 may transmit data transmission 225 containing information stored in information storage 213 to mobile device 230. In one embodiment, data response 223 and data transmission 225 may be used to synchronize the information stored in information storage 213 and 233. For example, mobile device 210 and mobile device 230 may both have call logs of missed phone calls. MDES 211 may retrieve mobile device 230's missed phone calls from the MDES 231 and also send mobile device 210's missed phone calls to MDES 231. This way, the missed calls from either of mobile devices 210 and 230 may be accessed from the other mobile device, thereby ensuring all important information, such as the call logs of missed phone calls, may be available at both of mobile devices 210 and 230.

Note that the authentication process described above in regard to data request 221, and any other authentication or authorization process described herein, may also be performed with regard to data response 223 and/or data transmission 225. For example, each of data response 223 and data transmission 225 may include a passcode associated with the mobile device transmitting such transmissions that is used by the receiving mobile device to determine that the transmission is from an approved device. This may provide added security because it will prevent not only access to information in information storage 213 and/or 233 by an unauthorized device, but also unauthorized entry of information into information storage 213 and/or 233 by an unauthorized device. Data and transmissions from unauthorized devices may include such undesirable content as viruses, spy software, worms, or any other potentially harmful and privacy invasive content. Therefore, authentication may be employed for all transmissions between devices to avoid receipt of such content.

Figure 3:
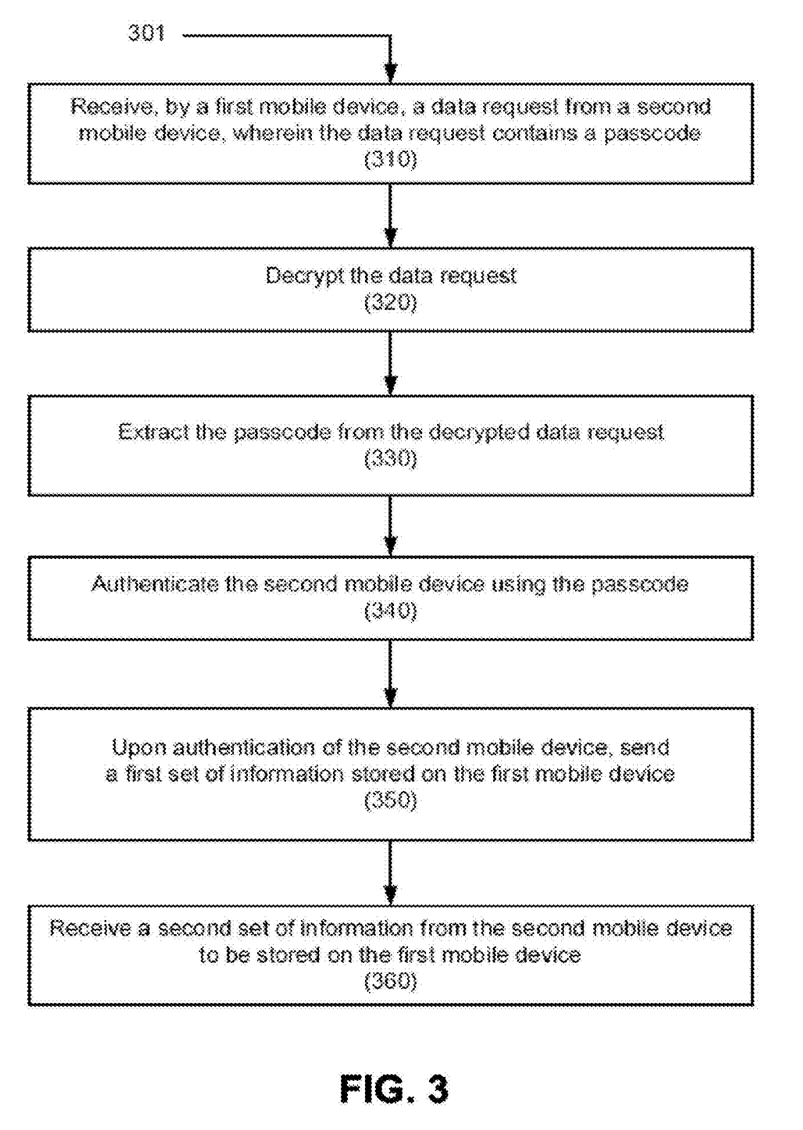
FIG. 3 shows a flow diagram of an illustrative embodiment of a process for providing information to a remote mobile device.

FIG. 3 shows a flow diagram of an illustrative embodiment of a process 301 for retrieving information from a remote mobile device. Process 301 may include one or more operations, functions, or actions as illustrated by blocks 310, 320, 330, 340, 350, and/or 360, which may be performed by hardware, software, firmware, or any combination thereof. The various blocks are not intended to be limiting to the described embodiments. For example, one skilled in the art will appreciate that, for this and other processes and methods disclosed herein, the functions performed in the processes and methods may be implemented in any order. Furthermore, the described functions and operations are only provided as examples, and some of the functions and operations may be optional, combined into fewer functions and operations, or expanded into additional functions and operations without detracting from the essence of the disclosed embodiments. Although the blocks are illustrated in a sequential order, these functions and operations associated with the blocks may also be performed in parallel, and/or in a different order than those described herein. In some embodiments, machine-executable instructions for process 301 may be stored in memory, executed by a processor, and/or implemented in mobile devices such as those described in regard to FIG. 1 and FIG. 2.

Process 301 may begin at block 310 ("Receive, by a first mobile device, a data request from a second mobile device, wherein the data request contains a passcode"), where a first mobile device may receive a data request from a second mobile device. Such a data request may contain a passcode of any type described herein. At block 320 ("Decrypt the data request"), the data request may be decrypted if necessary. Note that in some embodiments, data requests may not be encrypted, while in other embodiment data requests are encrypted. At block 330 (Extract the passcode from the decrypted data request"), the passcode may be determined from the decrypted data request. This may include decryption of the passcode if the passcode was encrypted prior to transmission by the second mobile device. At block 340 ("Authenticate the second mobile device using the passcode"), the second mobile device may be authenticated using the passcode. This may be accomplished by comparing the passcode to one or more passcodes associated with approved mobile devices and stored locally on the first mobile device to determine whether the received passcode matches one of the stored passcodes. At block 350 ("Upon authentication of the second mobile device, send a first set of information stored on the first mobile device"), upon authentication of the second mobile device based on the passcode, a first set of information stored on the first mobile device may be transmitted to the second mobile device. At block 360 (Receive a second set of information from the second mobile device to be stored on the first mobile device"), a second set of information from the second mobile device may be received for storage on the first mobile device.

At block 310, a first mobile device (e.g., mobile device 230 of FIG. 2) may receive a data request (e.g., data request 221) from a second mobile device (e.g., mobile device 210) via a mobile network. The data request may request a first set of information stored on the first mobile device. Further, the data request may be transmitted via the mobile network and may be in the form of, without limitation, a text message, a multimedia message, an email, or a phone call. The remote second mobile device may send the data request, which may contain a passcode for the first mobile device to authenticate the remote second mobile device. The remote second mobile device may encrypt the data request using any encryption means.

At block 320 a MDES running on the first mobile device may receive the data request for processing. In some embodiments, the MDES may be a mobile application running on the first mobile device, automatically and continuously monitoring, without limitation, the phone call, text message, and/or email received by the first mobile device. When the MDES determines that the received phone call, text message, and/or email are indeed intended for the MDES, the MDES may extract the data request and perform data decryption on the receive data request.

In some embodiments, the MDES may decrypt the data request based on public/private keys using known encryption/decryption techniques. Thus, the data request may be encrypted with a public key by the remote second mobile device, and the first mobile device, having received the data request, may decrypt the data request with a private key. The public and private key pairs may be preconfigured before the MDES decryption process at block 320.

The MDES may determine that a received phone call, text message, or email is intended for it using any of several methods. In one embodiment, the MDES may examiner the header of a received email or text message and determine, based on explicit and/or implicit indicators within the header, that the email or text message is intended for the MDES. In alternative embodiments, when a phone call is received, one or more designation tones (that may or may not be audible) may be detected by the MDES or otherwise activate the MDES. Any other means or method of detecting or determining that a received communication, including a phone call, text message, and email, is intended for an MDES may be used, and all such embodiments are contemplated as within the scope of the present disclosure.

At block 330, the MDES of the first mobile device may process the decrypted data request to extract the passcode embedded in the data request. As discussed above, the passcode may be a serial number of the remote second mobile device or any other data that may identify or be associated with the remote second mobile device. Alternatively, the passcode may be a password or any other user-defined data. The decrypted data request may contain additional information such as a request for the type of and/or the duration associated with the information to be retrieved.

At the block 340, the MDES of the first mobile device may authenticate the second mobile device using the extracted passcode. In one embodiment where the passcode is a unique serial number, the MDES may load from a key storage a list of one or more serial numbers of the mobile devices that are allowed to access the information stored on the first mobile device and/or provide information to be stored in the first mobile device. If the extracted passcode matches one of the serial numbers in the list, then the remote second mobile device may be deemed authenticated and the actions requested by the data request may be performed. Alternatively, the passcode may be a password that has been previously configured by a user on the first mobile device and may be securely stored in the first mobile device's key storage. In such an embodiment, if the received passcode matches any of the passwords stored in the key storage, the remote second mobile device may be deemed authenticated and the actions requested by the data request may be performed.

In some embodiments, upon authentication of the second mobile device, the first mobile device may treat the second mobile device as a trusted device, and send some or all of the contact information stored in the first mobile device to the second mobile device. Further, since the first mobile device may not accept data received from an un-trusted device, the authentication of the second mobile device may be required before the first mobile device would accept any data from the second mobile device. Such an approach may prevent the first mobile device from sharing data with an unauthenticated device or accepting potentially malicious data from this unauthenticated device.

At block 350, if the second mobile device is authenticated at block 340, the MDES of the first mobile device may extract a first set of information from the first mobile device based on the data request, and send the first set of information to the second mobile device in response to the data request. The first mobile device may send the first set of information using the same communication means by which the data request was received or using a different means. Any communication means may be used to transmit the first set of information (e.g., via the mobile network in a form of SMS text message, multimedia message, email, or phone call). In some embodiments, the MDES of the first mobile device may encrypt the first set of information before sending it to the remote second mobile device.

At block 360, with proper authentication, the MDES of the first mobile device may accept and receive from the remote second mobile device a second set of information to be stored in the information storage of the first mobile device. Similar to the data request received at the block 310, the first mobile device may receive the second set of information from the remote second mobile device via the mobile network in the form of phone call, text message, multimedia message, or email. The second set of information may also be encrypted to ensure security. Once decrypted, if necessary, the second set of information may be stored in an information storage of the first mobile device.

In some embodiments, the second mobile device may require the authentication of the first mobile device before transmitting the second set of information to the first mobile device, for example at block 360. In this case, the first mobile device may transmit a second data request to the second mobile device. The second data request may be different from the data request received by the first mobile device at block 310, and the second data request may contain a second passcode that differs from the passcode obtained at block 330. The MDES of the second mobile device may then use the second passcode to authenticate the first mobile device.

In order to authenticate the first mobile device before transmitting the second set of information, in one embodiment, the second mobile device may first send a request for an authentication transmission, such as the second data request, to the first mobile device. This request for an authentication transmission may be encrypted, and may also include a passcode. The passcode may be evaluated by the first mobile device in any manner as described herein to determine that the request for an authentication transmission is from an approved device. Once the request for an authentication transmission is itself authenticated, in response the first mobile device may then transmit a second data request with a passcode to the second mobile device. The second mobile device may then evaluate the passcode, in any manner as described herein, and determine whether the first mobile device is an approved device. Upon authenticating the first mobile device, the second mobile device may then transmit the second set of information to the first mobile device.

Alternatively, the first mobile device may be configured to automatically transmit a second data request for purposes of allowing the second mobile device to authenticate the first mobile device. For example, the MDESes configured on one or both of the first mobile device and the second mobile device may be configured to take steps to automatically synchronize data. The data request received at the first mobile device at block 310 may be a request for data relating to call logs or stored contacts. In response to detecting a request for call logs or contact information, the MDES on the first mobile device may be configured to automatically send a second data request requesting call logs or contact information from the second mobile device. Alternatively, the second data request may merely provide a passcode so that the second mobile device can authenticate the first mobile device, and the MDES of the second mobile device may be configured to expect such a data request and respond with call log or contact data. This way, the devices can maintain identical records and remain synchronized in regard to the data exchanged.

In one embodiment, a first mobile device's serial number is used as the passcode and is stored in the key storage of the second mobile device, while a second mobile device's serial number is not stored in the key storage of the first mobile device. In this embodiment, although the first mobile device may transmit information stored on the first mobile device to the second mobile device, without the serial number of the second mobile device in its key storage, the second mobile device may not be able to transmit information stored on the second mobile device to the first mobile device. This allows for one-way transmission of data where the first mobile device may be only a provider of data to the second mobile device, and not configured to receive data from the second mobile device. For example, the first mobile device may be owned by an employer, and may be configured to transmit data to the second mobile device, which may be an employee's device. However, the owner of the first mobile device may not wish to allow the employee's personal device (second mobile device) to send data to the employer's device (first mobile device). In such an embodiment, the first mobile device may be configured to automatically send data to the second mobile device, for example, when new data is received or generated on the first mobile device. In this embodiment, before the second mobile device store information from the first mobile device, the second mobile device may authenticate the first mobile device as one of its trusted devices using any of the means described herein.

In some embodiments, an MDES may sort through received information to avoid storing duplicated or outdated data to the mobile device. Referring again to FIG. 3, the second set of information received by the MDES of the first mobile device at block 360 may contain duplicated records that are already stored in the first mobile device. For example, the second set of information may contain a telephone number that is already stored in the first mobile device. In another example, a missed call may have been placed to the first mobile device and the second mobile device approximately at the same time. Then, the second set of information may contain such a missed call record. Saving this duplicative missed call record to the first mobile device's storage may cause the first mobile device to display two, instead of one, missed calls. In other words, if the second set of information is stored into the first mobile device without filtering out the duplicated or outdated records, then the first mobile device may end up having redundant or inconsistent data.

In some embodiments, the MDES of the first mobile device may process the second set of information before storing any of it in the information storage of the first mobile device. For example, after comparing the second set of information with the information that is already stored in the first mobile device, the MDES may discover that all of the second set of information may already exist, a subset of the second set of information may already exist, or none of the second set of information may already exist in the first mobile device. If the comparison result indicates that the second set of information is already stored in the first mobile device, then the second set of information may be discarded without storing any of it to the first mobile device. If the comparison result indicates that no record in the second set of information is stored in the first mobile device, then all records in the second set of information may be saved to the storage of the first mobile device.

In some embodiments, the MDES may store at least a part of the second set of information upon determining that the part of the second set of information is not already stored on the first mobile device. For example, the second set of information may include a name and a phone number. Upon determining that the name and phone number combination is not already stored, but that the same name is already stored with a different phone number, the MDES may just overwrite the already stored phone number with the phone number included in the second set of information. Alternatively, the MDES may store the received phone number and associate it with the name, retaining the already stored phone number. In addition, the MDES may also evaluate the timestamps of the received second set of information. Thus, even if the above mentioned comparison indicates the subset of the received second set of information does not exist, the MDES may still decide not to store the subset of information, because the information is deemed to be obsolete, or duplicative based on the timestamp. For example, where a received missed call record has a timestamp that is close to the timestamp of an already stored missed call record, the received missed call record may not be stored so that the device displays only one missed call record rather than two.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
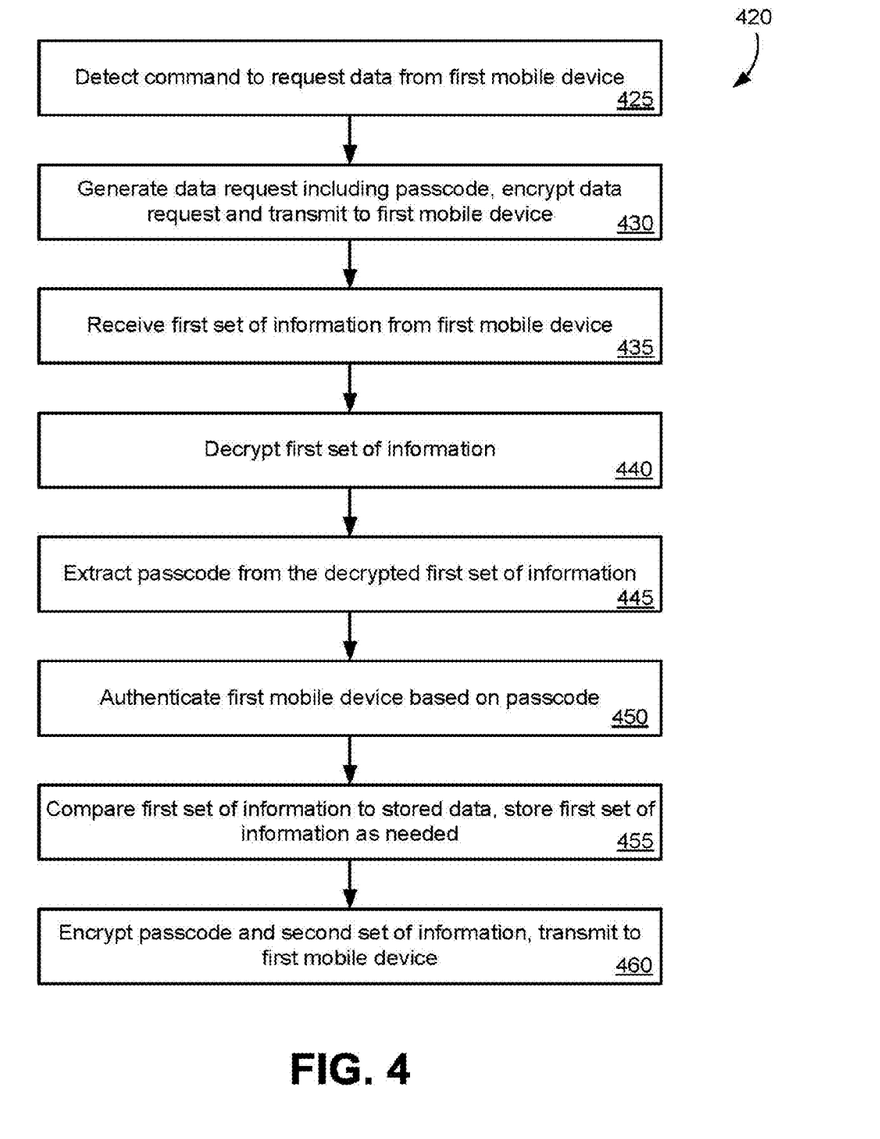
FIG. 4 shows a flow diagram of another illustrative embodiment of a process for retrieving information from a remote mobile device.

FIG. 4 illustrates an illustrative process 420 for retrieving data from a remote device. At block 425 ("Detect command to request data from first mobile device"), a command may be detected on a second mobile device instructing the second mobile device to retrieve data from a first mobile device. Such a command may be generated by a user operating the second mobile device to request data. For example, a user may manually manipulate an interface to an MDES configured on the second mobile device to cause the MDES to initiate the remote data retrieval process. Alternatively, the second user device may be configured to automatically request data from the first mobile device. For example, the MDES configure on the second mobile device may be configured to automatically request updated call logs from the first mobile device periodically (e.g., weekly, daily, or hourly). Alternatively, some detected occurrence, such as the arrival of a phone call, email, or text message, may trigger the MDES configured on the second mobile device to automatically implement process 420, or a subset thereof. All such embodiments are contemplated as within the scope of the present disclosure.

At block 430 ("Generate data request including passcode, encrypt data request and transmit to first mobile device"), a data request may be generated, including the passcode associated with the first mobile device, according to any of the embodiments described herein. In one embodiment, such a data request may be encrypted. The data request may then be transmitted to the first mobile device.

At block 435 ("Receive first set of information from first mobile device"), a first set of information may be received from the first mobile device. This may be the set of information provided by the first mobile device in response to the data request transmitted at block 430. The first set of information may include any type of information as described herein, and may take any form. This set of information may be encrypted, and may be decrypted by the second mobile device at block 440 ("Decrypt first set of information"). A passcode may be extracted or otherwise determined from the first set of information or from data that accompanied or is otherwise associated with the first set of information at block 445 ("Extract passcode from the decrypted first set of information"). In embodiments where a passcode may be encrypted independently of the other data transmitted with such a passcode, at block 445 the passcode may also be decrypted. At block 450 ("Authenticate first mobile device based on passcode"), the second mobile device may authenticate the first mobile device based on the passcode using any of the authentication means and methods described herein.

At block 455 ("Compare first set of information to stored data, store first set of information as needed"), the second mobile device may compare the first set of information to information and data that is already stored on the second mobile device and determine whether all, some, or none of the first set of information should be stored on the second mobile device, as described above. If any of the first set of information is to be stored on the second mobile device, such information may be stored at block 455.

At block 460 ("Encrypt passcode and second set of information, transmit to first mobile device"), the second mobile device may generate a second set of information and a passcode for the first mobile device, encrypt such information a d passcode, and transmit the information and passcode to the first mobile device. The MDES on the second mobile device may be configured to perform this automatically in response to receiving the first set of information from the first mobile device, or may determine that the first mobile device should receive the second set of information based on the first set of information. For example, the first set of information may include all text messages received at the first mobile device for the entire day. Based on this information, the MDES on the second mobile device may determine that there are text messages on the second mobile device that have not been received on the first mobile device. In response, the MDES on the second mobile device may then generate a second set of information that includes all the text messages received on the second mobile device that have not been received on the first mobile device. Any other means or methods of determining whether to provide a second set of information to the first mobile device may be used, and all such means and methods are contemplated as within the scope of the present disclosure.

Figure 5:
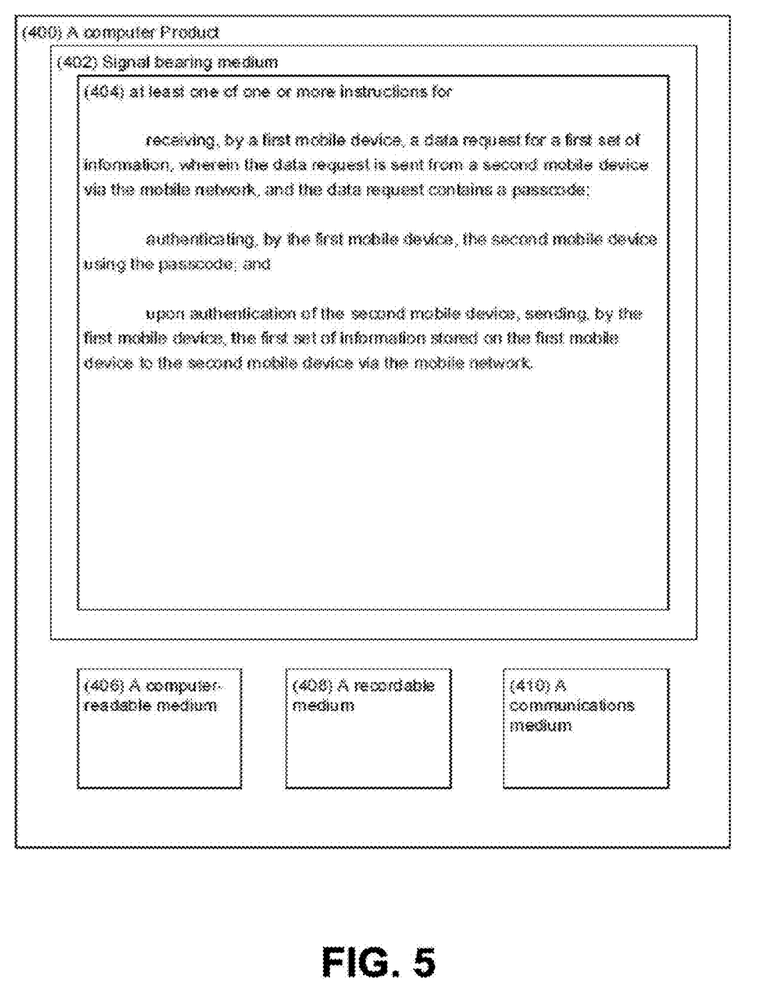
FIG. 5 shows an illustrative embodiment of an example computer program product for implementing remote information retrieval.

FIG. 5 is shows an illustrative embodiment of a computer program product 400 for implementing remote information retrieval. Computer program product 400 may include a data bearing medium 402. Data bearing medium 402 may include one or more sets of executable instructions 404 that, when executed by, for example, a processor, may provide the functionality described above. Thus, for example, referring to FIG. 1, the mobile device may undertake one or more of the operations shown in at least FIG. 2 in response to instructions 404

In some implementations, data bearing medium 402 may encompass a non-transitory computer readable medium 406, such as, but not limited to, a hard disk drive, a Compact Disc (CD), a Digital Video Disk (DVD), a digital tape, memory, etc. In some implementations, data bearing medium 402 may encompass a recordable medium 408, such as, but not limited to, memory, read/write (R/W) CDs, R/W DVDs, etc. In some implementations, data bearing medium 402 may encompass a signal bearing medium such as a communications medium 410, which may include, but is not limited to, a digital and/or an analog communication medium (e.g., a fiber optic cable, a waveguide, a wired communications link, a wireless communication link, etc.). Thus, for example, referring to MDES 111 or MDES 131 of FIG. 1, computer program product 400 may be wirelessly conveyed to MDES 111 or MDES 131 by data bearing medium 402, where data bearing medium 402 is conveyed by communications medium 410 (e.g., a wireless communications medium conforming with the IEEE 802.11 standard). Computer program product 400 may be recorded on non-transitory computer readable medium 406 or another similar recordable medium 408.

Figure 6:
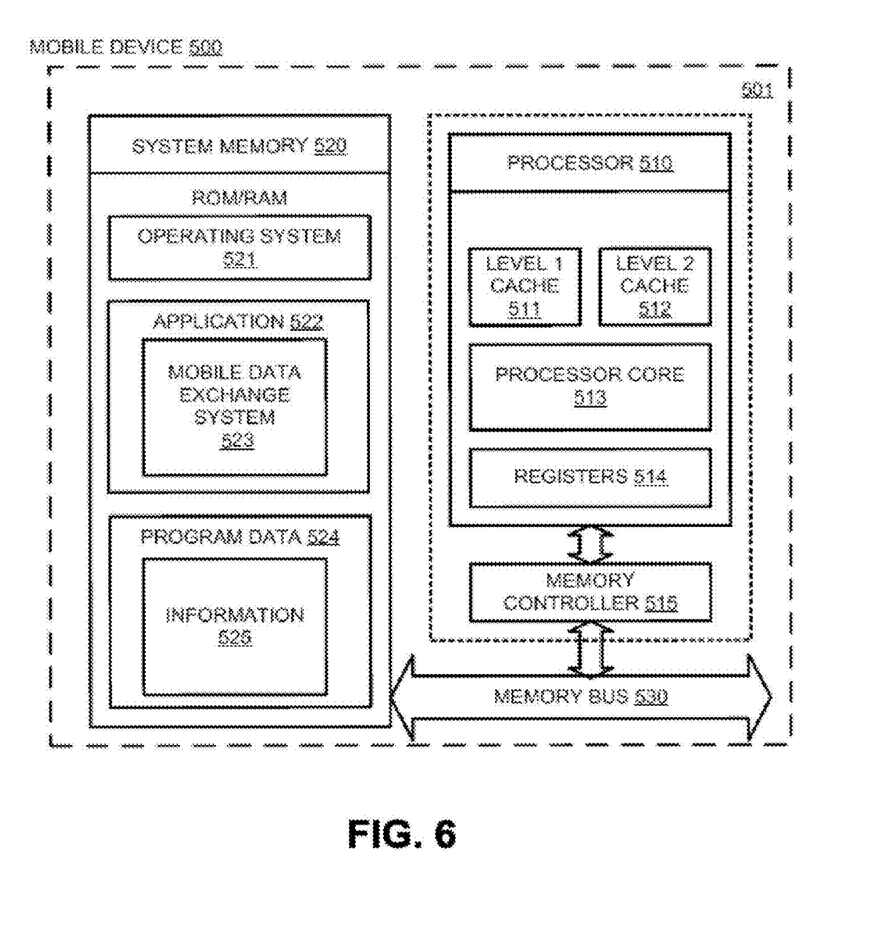
FIG. 6 shows a block diagram of an illustrative embodiment of an example mobile device that is arranged to perform remote information retrieval.

FIG. 6 shows a block diagram of an illustrative embodiment of an example mobile device 500 that is arranged to perform remote information retrieval. In a very basic configuration 501, mobile device 500 may include one or more processors 510 and system memory 520. A memory bus 530 may be used for communicating between processor 510 and system memory 520.

Depending on the desired configuration, processor 510 may be of any type including but not limited to a microprocessor (µP), a microcontroller (µC), a digital signal processor (DSP), or any combination thereof. Processor 510 can include one or more levels of caching, such as a level one cache 511 and a level two cache 512, a processor core 513, and registers 514. Processor core 513 can include an arithmetic logic unit (ALU), a floating point unit (FPU), a digital signal processing core (DSP Core), or any combination thereof. Memory controller 515 can also be used with processor 510, or in some implementations memory controller 515 can be an internal part of processor 510.

Depending on the desired configuration, system memory 520 may be of any type including but not limited to volatile memory (such as RAM), non-volatile memory (such as ROM, flash memory, etc.) or any combination thereof. System memory 520 may include operating system 521, one or more applications 522, and program data 524. Application 522 may include mobile data exchange system (MDES) 523 that is arranged to perform the functions and/or operations as described herein including at least the functional blocks and/or operations described with respect to process 301 of FIG. 3 and/or process 420 of FIG. 4. Program data 524 may include information 525 to be accessed by MDES 523. In some example embodiments, application 522 may be arranged to operate with program data 524 on operating system 521 such that implementations of the remote information retrieval may be provided as described herein. This described basic configuration is illustrated in FIG. 6 by those components within dashed line 501.

Figure 7:
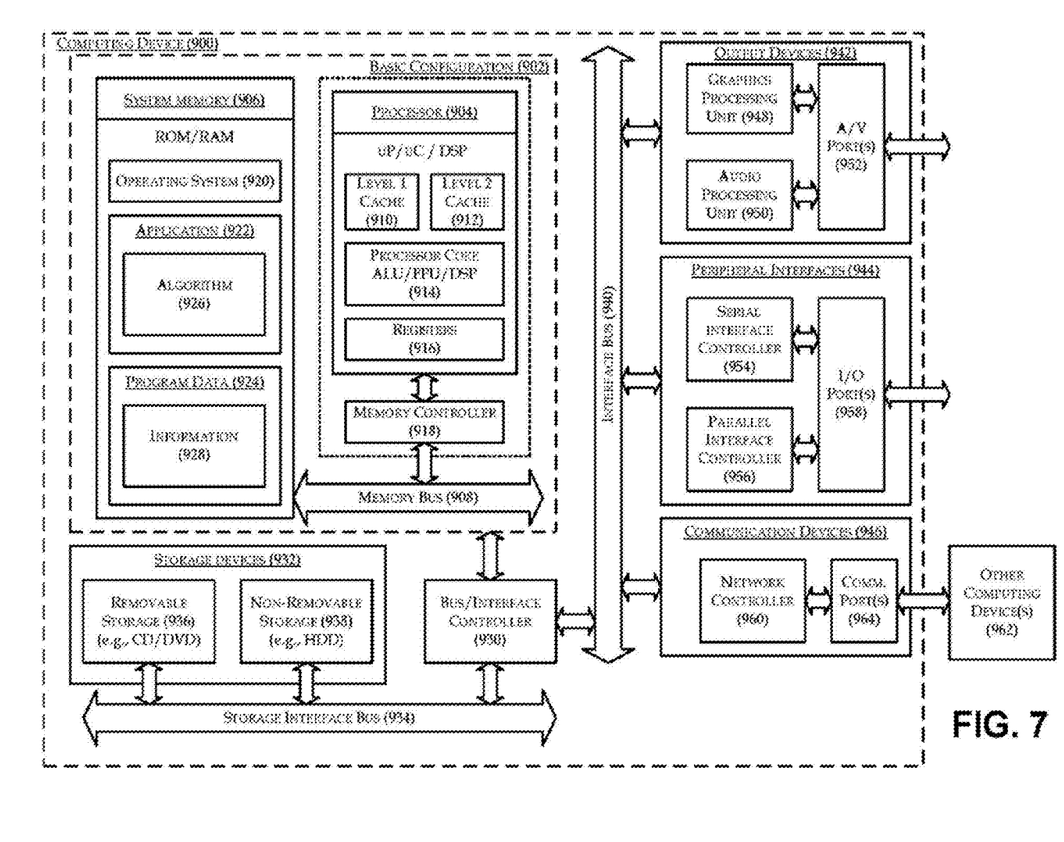
FIG. 7 show a block diagram of an illustrative embodiment of an example computing device that is arranged to perform remote information retrieval.

FIG. 7 is a block diagram illustrating an example computing device 900 that is arranged to perform remote information retrieval in accordance with the present disclosure. In a very basic configuration 902, computing device 900 typically includes one or more processors 904 and system memory 906. A memory bus 908 may be used for communicating between processor 904 and system memory 906.

Depending on the desired configuration, processor 904 may be of any type including but not limited to a microprocessor (µP), a microcontroller (µC), a digital signal processor (DSP), or any combination thereof. Processor 904 may include one more levels of caching, such as a level one cache 910 and a level two cache 912, a processor core 914, and registers 916. An example processor core 914 may include an arithmetic logic unit (ALU), a floating point unit (FPU), a digital signal processing core (DSP Core), or any combination thereof. An example memory controller 918 may also be used with processor 904, or in some implementations memory controller 918 may be an internal part of processor 904.

Depending on the desired configuration, system memory 906 may be of any type including but not limited to volatile memory (such as RAM), non-volatile memory (such as ROM, flash memory, etc.) or any combination thereof. System memory 906 may include an operating system 920, one or more applications 922, and program data 924. Application 922 may include a remote information retrieval algorithm 926 that may be arranged to perform the functions as described herein, including those described with respect to process 301 of FIG. 3 and/or process 420 of FIG. 4. Program data 924 may include information 928, such as a data request, a passcode, information stored on a mobile device, etc., that may be useful for remote information retrieval as is described herein. In some embodiments, application 922 may be arranged to operate with program data 924 on operating system 920 such that remote information may be retrieved as described herein. This described basic configuration 902 is illustrated in FIG. 7 by those components within the inner dashed line.

Computing device 900 may have additional features or functionality, and additional interfaces to facilitate communications between basic configuration 902 and any required devices and interfaces. For example, bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to", the term "having" should be interpreted as "having at least," the term "includes" should be interpreted as "includes but is not limited to", etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method for distributing information via a mobile network, comprising:
receiving, by a first mobile device from a second mobile device, a data request for a first set of information, wherein the data request comprises a passcode that is encrypted;
authenticating the second mobile device by decrypting the passcode and determining that the passcode corresponds to a stored passcode associated with a group of devices comprising the second mobile device; and
sending the first set of information stored on the first mobile device to the second mobile device via the mobile network.

2. The method of claim 1, further comprising:
receiving, by the first mobile device, a second set of information from the second mobile device via the mobile network; and
storing, by the first mobile device, the second set of information on the first mobile device.

3. The method of claim 2, wherein the second set of information is received as an encrypted text message, and the method further comprises:
decrypting, by the first mobile device, the encrypted text message to obtain the second set of information.

4. The method of claim 1, wherein sending the first set of information comprises:
encrypting, by the first mobile device, the first set of information; and
sending the encrypted first set of information as an encrypted text message.

5. The method of claim 1, wherein the data request is received as an encrypted text message, and the method further comprises:
decrypting the encrypted text message to obtain the data request.

6. The method of claim 2, further comprising:
determining whether the second set of information is already stored on the first mobile device; and
upon determining that the second set of information is not stored on the first mobile device, storing the second set of information in the first mobile device.

7. The method of claim 1, wherein the mobile network is a mobile cellular network.

8. The method of claim 1, wherein the data request is received as a Short Message Service (SMS) text message.

9. The method of claim 1, wherein the data request is received as an email message transmitted via the mobile network.

10. The method of claim 1, wherein the data request is received via a phone call.

11. The method of claim 1, wherein the first set of information includes at least one of a phone number, an email address, a call history, or a text message.

12. A mobile device configured to distribute information via a mobile network, the mobile device comprising:
an information storage configured to store information for the mobile device; and
a mobile data exchange system coupled to the information storage, the mobile data exchange system configured to:
authenticate a remote device using a passcode that is encrypted and embedded in a data request for a first set of information by decrypting the passcode and determining that the passcode corresponds to a stored passcode associated with a group of devices comprising the remote device, and,
responsive to authenticating the remote device, transmit a first set of information retrieved from the information storage.

13. The mobile device of claim 12, further comprising:
a key storage coupled with the mobile data exchange system, the key storage configured to store a key associated with the group of devices.

14. The mobile device of claim 12, wherein the mobile data exchange system is further configured to encrypt the first set of information prior to transmitting the first set of information.

15. The mobile device of claim 12, wherein the mobile data exchange system is further configured to:
receive a second set of information from the remote device;
compare the second set of information with the information in the information storage to generate a comparison result; and
store at least a part of the second set of information in the information storage based on the comparison result.

16. The mobile device of claim 13, wherein the key stored in the key storage is the stored passcode.

17. The mobile device of claim 12, wherein the mobile data exchange system and the remote device are configured to interact with each other via a mobile cellular network.

18. A non-transitory computer-readable medium comprising a sequence of instructions for distributing information via a mobile network, which when executed by a first mobile device, cause the first mobile device to:
in response to a data request for a first set of information received from a second mobile device, authenticate the second mobile device using a passcode that is encrypted and received with the data request by decrypting the passcode and determining that the passcode corresponds to a stored passcode associated with a group of devices comprising the remote device; and
upon authentication of the second mobile device, transmit the first set of information stored on the first mobile device to the second mobile device.

19. The non-transitory computer-readable medium of claim 18, further comprising a sequence of instructions, which when executed by the first mobile device, cause the first mobile device to:
receive a second set of information from the second mobile device;
compare the second set of information with information stored on the first mobile device to generate a comparison result; and
store at least a part of the second set of information on the first mobile device based on the comparison result.

20. The non-transitory computer-readable medium of claim 18, wherein the stored passcode is a key stored on the first mobile device.

* * * * *